Aug. 5, 1958     J. I. HARPER     2,846,292
CONTINUOUS CRYSTALLIZATION APPARATUS
Filed Aug. 23, 1955     4 Sheets-Sheet 1
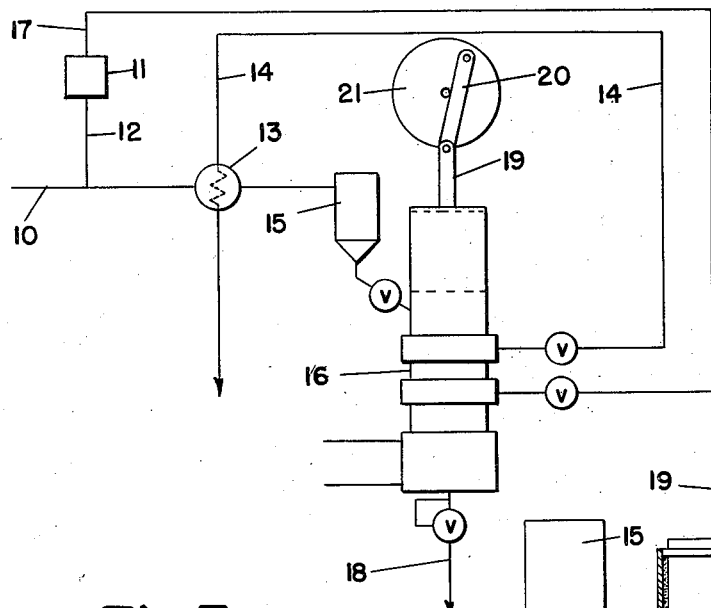
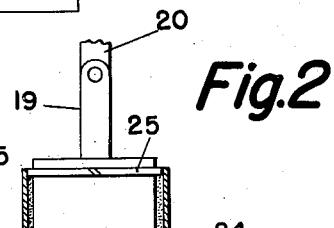
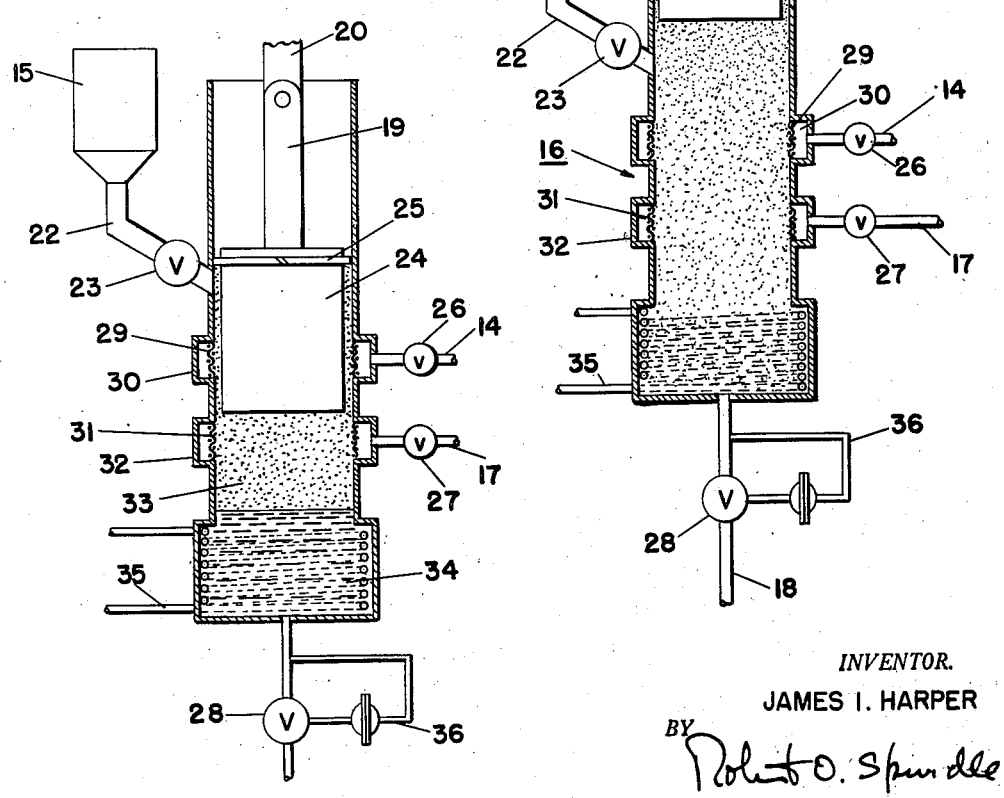
INVENTOR.
JAMES I. HARPER
BY Robert O. Spindle
ATTORNEY Aug. 5, 1958  J. I. HARPER  2,846,292
CONTINUOUS CRYSTALLIZATION APPARATUS
Filed Aug. 23, 1955  4 Sheets-Sheet 2

*INVENTOR.*
JAMES I. HARPER
BY
ATTORNEY

Aug. 5, 1958  J. I. HARPER  2,846,292
CONTINUOUS CRYSTALLIZATION APPARATUS
Filed Aug. 23, 1955  4 Sheets-Sheet 3

INVENTOR.
JAMES I. HARPER
BY
Robert O. Spindle
ATTORNEY

Aug. 5, 1958  J. I. HARPER  2,846,292
CONTINUOUS CRYSTALLIZATION APPARATUS
Filed Aug. 23, 1955  4 Sheets-Sheet 4
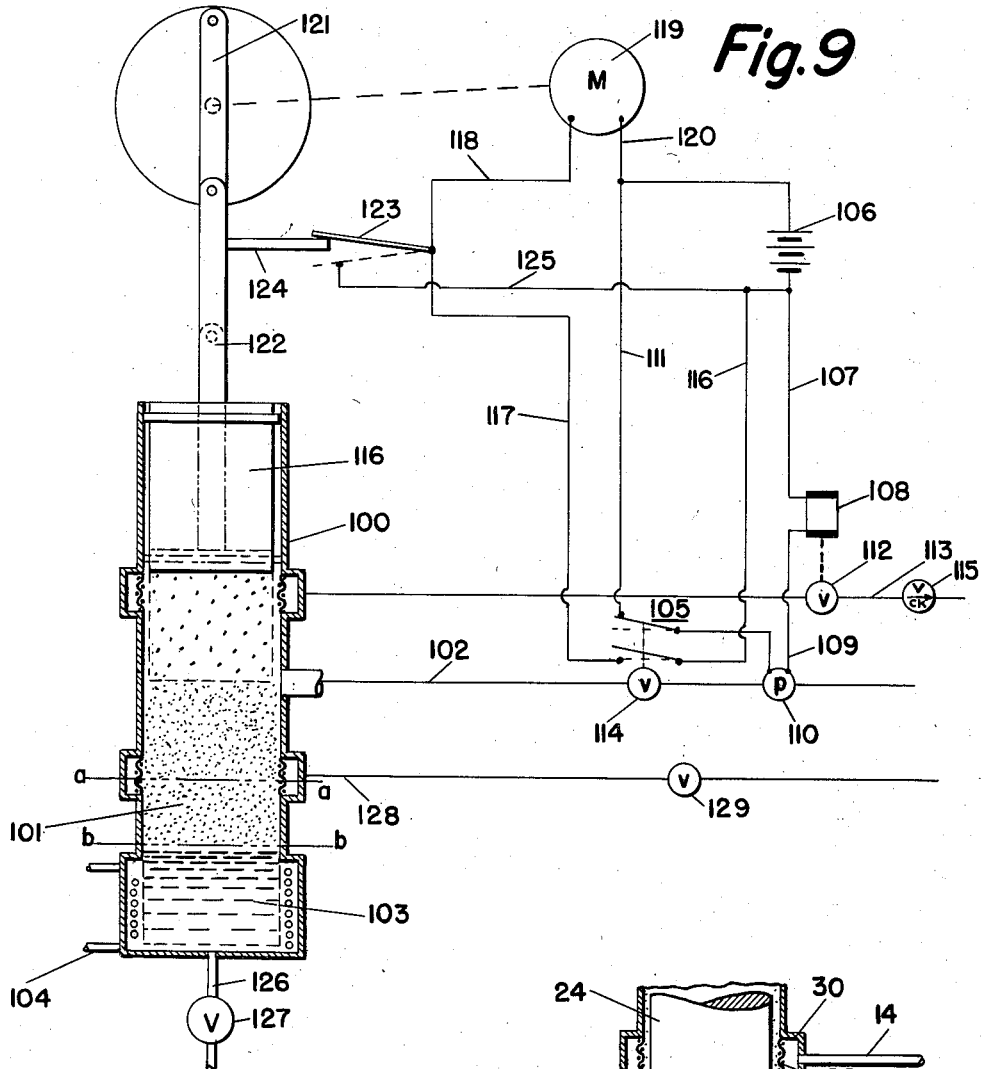
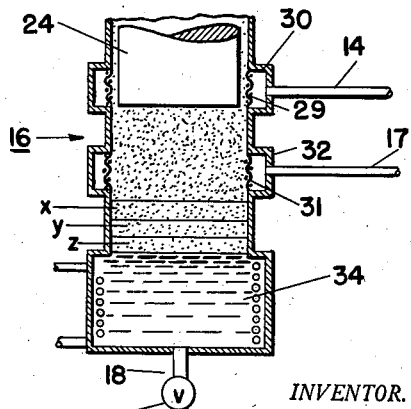
INVENTOR.
JAMES I. HARPER
ATTORNEY United States Patent Office 2,846,292
Patented Aug. 5, 1958

2,846,292

CONTINUOUS CRYSTALLIZATION APPARATUS

James I. Harper, Media, Pa., assignor to Sun Oil Company, Philadelphia, Pa., a corporation of New Jersey Application August 23, 1955, Serial No. 530,158

11 Claims. (Cl. 23—273)

This invention relates to an apparatus for separating mixtures of liquids into relatively pure fractions, and more particularly to a continuous crystallization apparatus.

It is realized that a number of methods have been developed in the past for continuously fractionating liquids by means of fractional crystallization, but these prior processes have had the serious defect that, if the desired crystal-forming product is recovered in highly purified form, there is an excessive loss of the desired product to the mother liquor, from which it cannot be economically recovered, or conversely, if the process is operated to produce a high yield of crystallizable product, the desired purity is not obtained. Such processes have generally employed a separation vessel having a cold end and a warm end, the feed being admitted to the vessel at a point between the ends thereof. The feed comprises a slurry of crystals in the mother liquor, and in one type of fractional crystallizer a foraminous piston is provided to push the crystals toward the warm end of the vessel, where they are melted. A certain proportion of the melt is withdrawn from the warm end, while another proportion of the melt is displaced by the crystals being forced to the warm end, and flows countercurrently to the crystals, thus backwashing the crystals to the desired degree of purity. This portion of the melt eventually finds its way to the cold end of the vessel, where it is removed with the mother liquor.

An apparatus of this type is shown in U. S. Patent 2,615,793 to Weedman. As may be observed from the table in column 4, benzene in high purity may be recovered from a benzene-n-heptane mixture, but the low melting product recovered from the cold end of the apparatus contains an excessive amount of benzene. In addition, the mesh piston employed for pushing the crystals toward the warm end of the separation would appear to be rather fragile.

It has also been proposed to employ a solid piston to move the crystals from one end of the separation vessel to the other. Thus in U. S. Patent No. 2,617,274 to Schmidt, an apparatus is shown for concentrating aqueous solutions such as fruit juice. In this apparatus the feed, consisting of a slurry of ice crystals in juice components, is introduced at the cold end of a tube and is pushed toward the warm end thereof. A concentrate is taken off at the mid point of the tube and water is taken off at the warm end. While this method is satisfactory for producing a concentrate of the lower melting component, there is necessarily a greater or less degree of contamination of the water by juice components which diffuse into the water in water-ice zone $a$. Since the water is withdrawn as a waste product, this contamination presents no problem. If, however, the higher melting component of the mixture is the one which it is desired to recover in high purity, the apparatus would not be satisfactory.

It is an object of this invention to provide an apparatus for separating mixtures of compounds of higher and lower melting points by fractional crystallization, which will allow the recovery of the higher melting component of the mixture in high purity, while minimizing the proportion of the higher melting component recovered in admixture with the lower melting component.

In general, my invention comprises chilling a multicomponent liquid to a temperature at which one of its components will crystallize, at least in part, and at which but a small proportion of the other components of the liquid will crystallize. The slurry of crystals in mother liquor is then passed to a tube through a valved inlet passage. The tube is provided at one end with a heating means contained within a heating zone. A piston is reciprocably movable in the tube at the other end thereof. A valved mother liquor offtake line leads from the tube at a point near the end thereof opposite the end containing the heating means; a valved reflux offtake line leads from the tube at a point spaced from the mother liquor line in the direction of the heating means; and a valved product recovery line leads from the tube at a point adjacent the heating means.

In starting up, after the tube is full of the crystalmother liquor slurry, movement of the piston is started toward the end of the tube containing the heating means, which for convenience will hereinafter be termed the warm end. As the piston starts its movement, the valve in the inlet line will close, to prevent back-flow of the liquid in the tube through this line. The moving piston will compress the crystals into a more or less compact mass, while forcing mother liquor out through the mother liquor line, the valve in which is open. A screen is provided over the end of this line to prevent passage of crystals thereinto. At this time the reflux line valve and the product recovery valve line are closed. As the piston passes the mother liquor line the valve therein will close, and the valve in the reflux line will open. Upon further movement of the piston to a point adjacent the reflux line, liquid will be forced out through the reflux line, the entrance to which is also screened to prevent passage of the crystals. This liquid will be recycled to the process in a manner to be more particularly described hereinafter in connection with the detailed description of the invention. When the piston reaches the limit of its travel, adjacent the reflux line, the crystals beyond this point will have been compressed to a semi-solid column, the end of which extends to the heating means, which will melt a portion of the crystals to form a pool of liquid in the heating zone. This liquid will be richer in the higher melting component of the feed than the feed itself, but will still contain a considerable proportion of the lower-melting component, derived from the interstitial liquid in the compacted crystal mass.

The piston is now withdrawn to its original position in the cool end of the tube, the valve in the reflux line closing in response to the reversal of movement in order to prevent back-flow of liquid therein to the tube, while the valve in the inlet passage will open to permit slurry to flow into the tube to fill the void created by the withdrawal of the piston. When the piston reaches the limit of its travel toward the cold end of the tube, there will exist in the tube a pool of liquid in the heating zone, a compacted mass of crystals between the heating zone and the reflux line, and a loose slurry of crystals and mother liquor extending from the reflux line to the base of the piston. Upon a second forward movement of the piston the valve in the inlet line will close, the valve in the mother liquor offtake line will open, and the piston will compress the loose slurry of crystals, forcing mother liquor out of the mother liquor line, until the face of the piston reaches the mother liquor exit line, at which time a more or less solid mass of crystals will be compacted on top of the previously formed compacted column of crystals. Upon further motion of the piston, to a point opposite the reflux line, the column of crystals will be forced into the heating zone, displacing an equivalent amount of liquid therein. The displaced liquid flows countercurrently to the crystal column, washing adherent mother liquor therefrom, and is removed via the reflux line.

Since the mother liquor has been washed from the crystal column by the reflux liquid, that portion of the crystals which has been forced into the heating zone will be relatively pure, and, upon melting, the concentration of the higher melting component of the feed in the melt will be increased. The process outlined above is therefore continued until the concentration of the higher melting component is built up to the desired amount, say 99% or over. Thereafter, the valve in the product recovery line is opened during the movement of the piston from the cold end of the tube to the mother liquor offtake line, allowing a purified product to be taken off at this time. When the piston passes the mother liquor offtake line, the product recovery line will close, so that reflux from the heating zone may be forced backward through the entering column of crystals, to wash them free of adherent mother liquor. This line will also remain closed during the withdrawal stroke of the piston, to prevent reentry of product to the heating zone. Alternatively the product recovery line may have means interposed therein to continuously withdraw a portion of the higher melting component, leaving within the tube a sufficient amount thereof to serve as reflux.

Having now described the invention in general terms, it will be described in more detail in connection with the accompanying drawings, in which

Fig. 1 is a diagrammatic flow sheet of the process;

Fig. 2 is a cross-sectional elevational view of a crystal separation tube according to my invention, with the piston in withdrawn position in the cold end of the tube prior to starting operation of the process;

Fig. 3 is a cross-sectional view of the tube of Fig. 2 with the piston at the end of its power stroke;

Fig. 9 is a diagrammatic view of the tube incorporating a somewhat different control system; and, Fig. 10 is a cross-sectional view of a portion of the tube as it would appear when filled with crystals from a mixed xylene feed stock.

Figure 4:
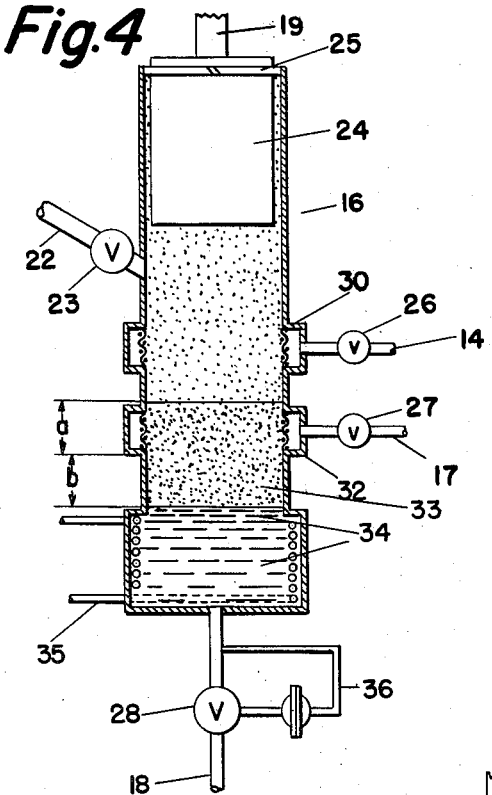
Fig. 4 is a cross-sectional elevation of the tube of Fig. 2, with the piston in withdrawn position in the cold end of the tube, as the interior of the tube would appear after withdrawal of the piston from the position shown in Fig. 3.

Referring now to Fig. 1, a liquid feed, comprising a relatively high-melting component A and a relatively low-melting component B is introduced to the process through line 10 and is mixed with reflux liquid, withdrawn from storage 11 through line 12. The mixture is then passed through heat exchanger 13, in which it is cooled by indirect heat exchange with cold mother liquor flowing through mother liquor offtake line 14. The feed then passes to chiller 15, in which it is cooled to a temperature such that component A will crystallize out to form a slurry of crystals of component A in liquid component B. The slurry is then fed to crystal separation tube 16, from which a mother liquor richer in component B than the feed is withdrawn through line 14, a reflux stream, containing some component A, along with component B, is withdrawn through reflux line 17, and a product stream of purified component A is withdrawn through product line 18.

Piston rod 19 extends from one end of tube 16, and is connected with means for imparting a reciprocal motion thereto, illustrated as a crankshaft 20 attached to a rotatable flywheel 21.

Referring now more particularly to Fig. 2, the crystal separation tube is shown in the condition in which it would be when starting up the process. A slurry of crystals in mother liquor has been admitted to tube 16 from chiller 15 through line 22 and check valve 23, so as to completely fill the tube 16. Piston 24, which has a diameter such that a clearance is provided between it and the wall of tube 16, is in position at the upper end thereof. Piston 24 carries a piston ring 25 which makes a snug fit with the wall of tube 16 to make a seal against the passage of liquid. Check valve 26 in line 14, back pressure valve 27 in line 17, and valve 28 in line 18 are, at this time, all closed.

Piston 24 is now started on its power stroke towards the other end of tube 16. Pressure developed inside tube 16 by the movement of the piston will close check valve 23 and open check valve 26, allowing mother liquor to flow out through screen 29 into annular space 30, and thence out through line 14. When the face of the piston 24, passes annular space 30, the pressure in the tube 16 will rise, due to the pressure drop across the constricted orifice between piston 24 and the wall of tube 16, to a point sufficient to cause back pressure valve 27 in reflux line to open, allowing liquid to escape through screen 31, annular space 32, and line 17.

The piston 24 now continues its power stroke until it reaches the position shown in Fig. 3. As may be seen from the drawing, the crystals have been compressed into a semi-solid column 33, extending from the face of the piston 24 to the upper surface of a crystal-free pool of liquid in heating zone 34, which pool of liquid has been formed by melting of crystals by heating coil 35.

Piston 24 is now withdrawn to the position shown in Fig. 4. During the withdrawal, suction developed in the interior of tube 16 will close valves 26 and 27, and will open valve 23 to allow slurry to pass through line 22 into the interior of tube 16 via the space between piston 24 and the walls of tube 16. At this time, the interior of the tube 16 is filled with liquid in heating zone 34, a packed crystal column 33 immediately thereabove, and a loose slurry of crystals in mother liquor extending from the top of column 33 to the face of piston 24.

Figure 5:
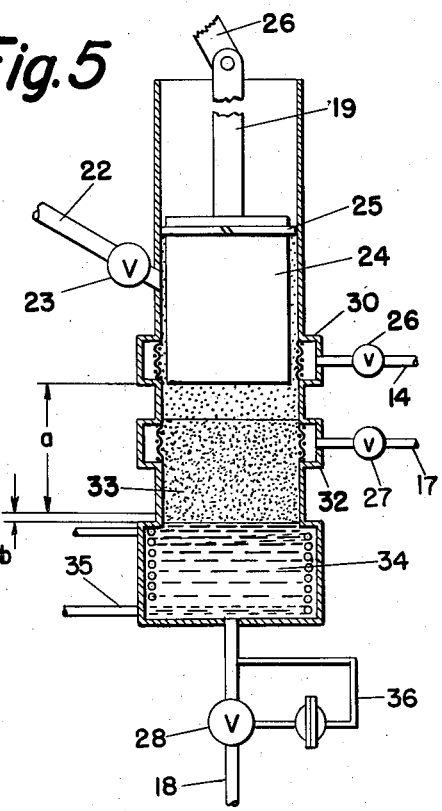
Fig. 5 is a cross-sectional elevation of the tube of Fig. 2, with the piston in a position opposite the mother liquor offtake line, during its downward motion from the position shown in Fig. 4.

Now as piston 24 starts again on its downward journey, the crystals in the slurry will be compacted on top of column 33, while mother liquor is forced out of tube 16 via line 14, until the piston reaches the position shown in Fig. 5. At this time, the crystals will have become compacted sufficiently so that a further movement of the piston to the position illustrated in Fig. 6 will force the column 33 down into the liquid in heating zone 34, displacing an equivalent amount of liquid, which will flow upward countercurrently through the crystals in column 33, and out through reflux line 17. Since this displaced liquid is relatively rich in component A, it is recycled to the feed as illustrated in Fig. 1, thus insuring a minimum loss of component A.

Since the crystals forced into heating zone 34 by piston 24 are substantially pure component A, it follows that on each cycle of operation the proportion of component A in the liquid in zone 34 will increase, until a point is reached at which it consists of substantially pure component A. When this point is reached, valve 28 in product line 18 is controlled to be open during a portion of the power stroke of the piston to withdraw purified component A. As illustrated in Figs. 2 through 6, valve 28 is pressure controlled, pressure line 36 leading from line 18 to the valve control. As is well known in the art, such pressure controlled valves may be set to open the valve in response to high or low pressures in the line in which they are installed, or may be set to close the valve at both high and low pressures while opening the valve at intermediate pressures. Thus, for example, the control could be set to open valve 28 only under the intermediate pressure conditions present during the travel of piston 25 from the position of Fig. 4 to that of Fig. 5, and to close valve 28 under the high pressure present during the travel of piston 24 from the position of Fig. 5 to that of Fig. 6, and under the low pressure conditions existing during the withdrawal of piston 24 from the position of Fig. 6 to that of Fig. 4. Under these circumstances, at the start of the power stroke, two zones would exist in column 33, an upper zone $a$, in which the interstices of the crystals are filled by mother liquor, and lower zone $b$, in which the interstices of the crystals are filled with relatively pure liquid component A. Now as the piston moves from the Fig. 4 position to that of Fig. 5, liquid component A will be displaced downwardly, liquid equivalent to that displaced being withdrawn through line 28, at which time zones $a$ and $b$ will have assumed the positions shown in Fig. 5. On movement of piston 24 from its Fig. 5 position to that of Fig. 6, valve 28 will close, and the crystals forced into heating zone will displace sufficient liquid therein to backwash the column 33 to restore the zones to the position shown in Fig. 4.

Figure 6:
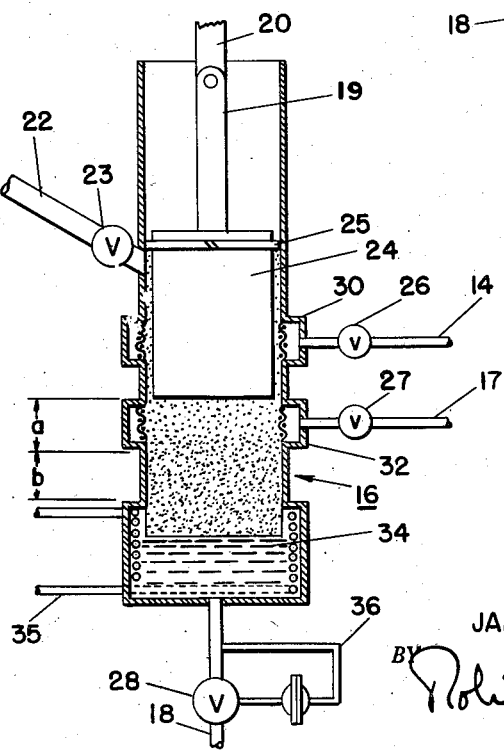
Fig. 6 is a cross-sectional view of the tube of Fig. 2, with the piston in the position which it occupies at the end of its power stroke from the position shown in Fig. 5.

Alternatively, valve 28 may be controlled to open only during the movement of piston 24 from the position of Fig. 5 to that of Fig. 6. Under these circumstances, the orifice of valve 28 will be controlled to allow the passage of only a portion of the liquid displaced by the entry of crystals into heating zone 34, the balance of the displaced liquid being forced upwardly in countercurrent flow to the crystals, and out through line 17 in order to wash mother liquor from that portion of the column 33 forced downwardly passed the entrance to line 17.

In the embodiment of the invention illustrated in Figs. 2 through 6, no positive means are provided for closing valve 26 during movement of piston 24 from the position of Fig. 5 to that of Fig. 6, so that during this movement a small amount of liquid will escape between the piston 24, and the wall of tube 16, and out through line 14. Ordinarily this is of little moment, since the liquid will consist almost entirely of mother liquid. In certain operations, however, an economically significant amount of component A may be lost through this route. In such cases a positive control should be included in the system to insure that valve 26 closes when the piston 24 reaches the position shown in Fig. 5, and remains closed until the piston again reaches the position shown in Fig. 4.

Figure 7:
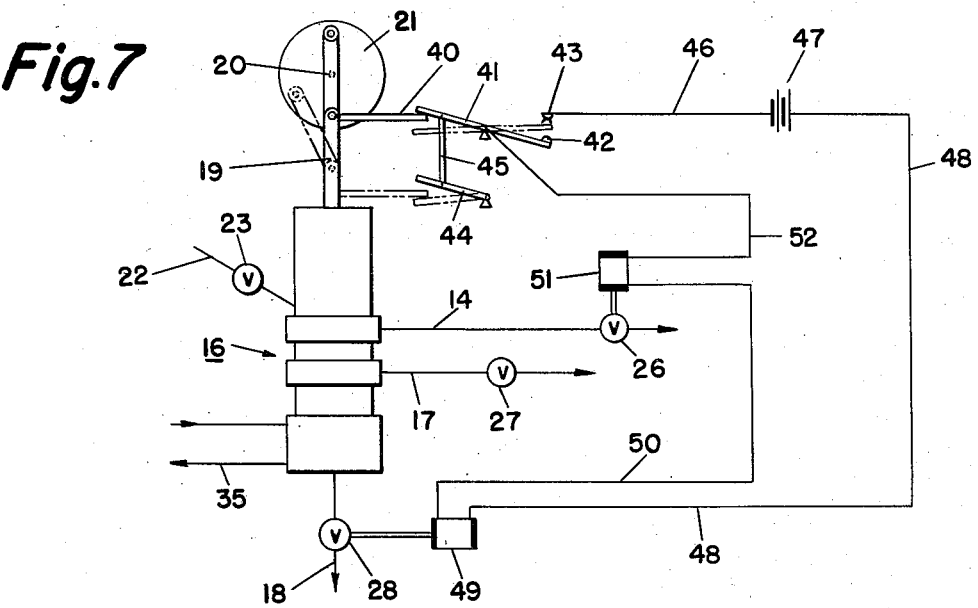
Fig. 7 is a diagrammatic view of the tube incorporating means for positive opening and closing of the mother liquor offtake line and the product recovery line.

Such valve control means are diagrammatically shown in Fig. 7. Piston rod 19 carries an outwardly projecting lug 40 adapted to contact pivoted switch arm 41 to move movable contact 42 out of contact with fixed contact 43 as the piston 24 approaches its Fig. 4 position as shown in the solid lines. As piston 4 moves to the position shown in Fig. 5, as indicated by the dotted lines in Fig. 7, lug 40 will contact pivoted arm 44, which is connected to switch arm 41 by bar 45, and will move switch arm 41 to the position shown in the dotted lines, making contact of movable contact 42 with fixed contact 43, and energizing a circuit consisting of line 46, source of power 47, line 48, solenoid 49, line 50, solenoid 51, and line 52. Energization of solenoid 51 will close valve 26, and will maintain it in closed position until piston 24 again approaches the position of Fig. 4, at which time lug 40 will move switch arm 41 to break the circuit, allowing valve 26 to open.

Solenoid 49 may be used either to open valve 28 from normally closed position, or to close it from normally open position, depending upon whether it is desired to withdraw product through line 18 during the movement of the piston from the Fig. 4 position to the Fig. 5 position, or from the Fig. 5 position to the Fig. 6 position, as described above. In the former case, energized solenoid 49 will operate to close valve 28, in the latter case, it will operate to open it. When the solenoid 49 operates to open valve 28, a check valve (not shown) should be placed in line 18 to prevent backflow of product into tube 16 during the withdrawal of piston 25, since the solenoid will hold valve 28 open until the circuit is deenergized as the piston again reaches the position of Fig. 4.

The apparatus described above is quite satisfactory in handling feed stocks which contain a considerable percentage of component A, but occasionally situations are found where the liquid to be fractionated contains only a small proportion of component A. In such cases there may be insufficient crystals in the slurry to form on each stroke of the piston a semi-solid mass on top of the previously formed column of a depth sufficient to allow any considerable amount of crystals to be forced into the heating zone, and the reflux action following on such introduction of crystals, will be insufficient to wash the crystals clean of mother liquor. To take care of this situation, the control system illustrated in Fig. 8 is provided.

Figure 8:
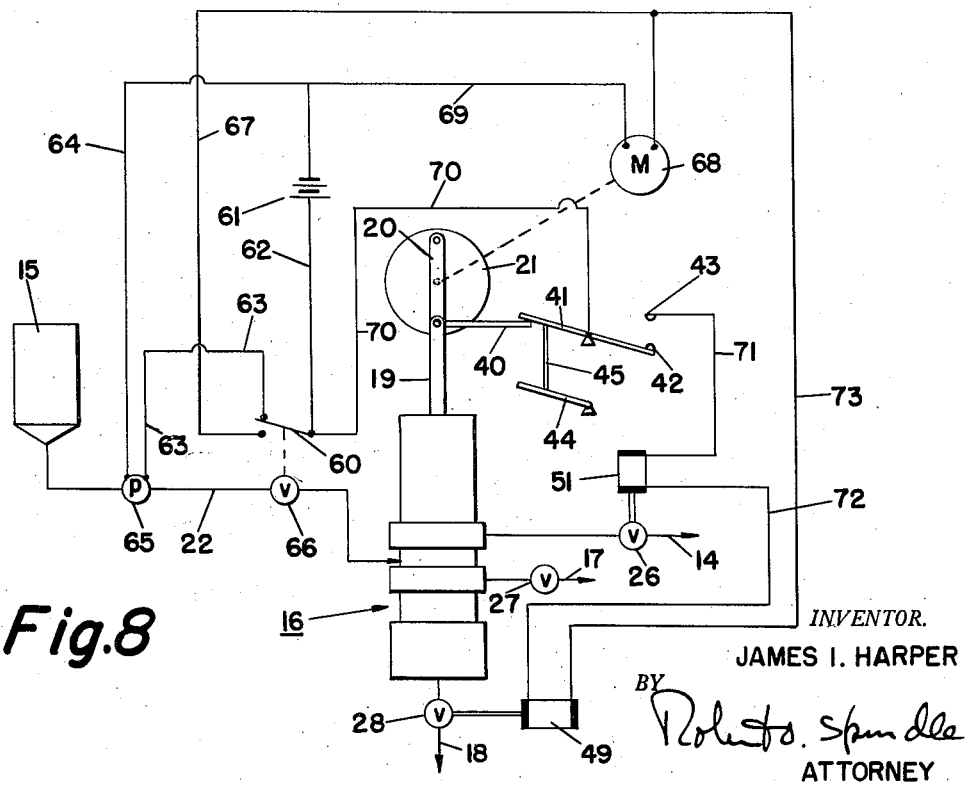
Fig. 8 is a diagrammatic view of the tube incorporating control means allowing the piston to dwell at the cold end of the tube for a predetermined period of time.

The apparatus of Fig. 8 is designed to allow piston 24 to dwell at the top of tube 16 while feed is being forced thereinto until a sufficient mass of crystals has been built up therein to enable the apparatus to function efficiently. As illustrated, piston 24 is at the top of its stroke, and two-way switch 60 closes an electric circuit comprising source of power 61, and lines 62, 63, and 64. Closing of this circuit, hereinafter referred to as the pump circuit, energizes pump 65, and causes it to pump feed from the chiller 15 through line 22 and valve 66 to the interior of tube 16. Mother liquor will flow out through line 14, the crystals being held within tube 16 by screen 29. As the crystals build up in tube 16, they will offer increased resistance to the flow of liquid, and the pressure in line 22 will rise. When this pressure builds up to a predetermined degree, valve 66, which is designed to close in response to a pressure build-up in tube 16, will close, and in closing will shift switch 60 to break the pump circuit and close a first motor circuit, which consists of source of power 61, lines 62 and 67, motor 68, and line 69. Closing of this circuit will start motor 68, and force piston 24 downwardly. As the piston moves downwardly, lug 40 on piston rod 19 will contact pivoted arm 44, which is joined to switch arm 41 by bar 45, in the same manner as discussed in connection with Fig. 7, whereby to move movable contact 42 into contact with fixed contact 43, to energize a second motor circuit which includes source of power 61, lines 62, 70, and 71, solenoid 51, line 72, solenoid 49, line 73, motor 68, and line 69. Solenoids 49 and 51, upon being energized, will control valves 28 and 26, respectively, in exactly the same manner as described in connection with Fig. 7. Energization of motor 68 by this circuit will not affect the motion of the piston at this time, since motor 68 is already energized from the same source of power via the first motor circuit.

As the piston 24 reaches the end of its stroke and starts upward, the reduced pressure in tube 16 will allow valve 66 to open. It will be noted that in this embodiment of the invention line 22 leads into tube 16 at a point just above the top of the packed crystal column 33. This is necessary, since the pressure drop in the annular passage between piston 24 and the walls of tube 16 may be such that the pressure in line 22 would not be lowered sufficiently to cause valve 66 to open, if line 22 led into tube 16 at a point near the top thereof. If valve 66 did not open, an undesirable vacuum would be created, which might cause evaporation of some of the liquid in tube 16, with accompanying lowering of temperature, which might be sufficient to cause some of component B to freeze out and contaminate the mass of component A crystals.

Opening of valve 66 will open the first motor circuit and close the pump circuit to allow feed to be pumped into tube 16. Opening of the first motor circuit will not affect the movement of piston 24, since at this time the second motor circuit is closed, and the motor will remain energized. The piston will therefore continue to rise until lug 40 contacts switch arm 41, moving contact 42 away from contact 43, to break the second motor circuit. The motor will then stop, and will remain at rest until pressure in line 22 has built up to a degree sufficient to cause valve 66 to close, to start another cycle.

Fig. 9 illustrates a somewhat different embodiment of the invention, in which the valve in the inlet line and the valve in the motor liquor exit line are controlled to open and close simultaneously. As illustrated, the solid lines indicate the position of the various parts as they would appear prior to the start of the power stroke of the piston, after the process has been on stream for a time sufficient to attain a steady state. In this condition separation tube 100 is filled with a compacted column 101 of crystals of component A extending from just below the entry of inlet line 102 to the top of the liquid pool in heating zone 103, which is heated by heating coil 104. Two-way switch 105 now closes a circuit which comprises source of power 106, line 107, solenoid 108, line 109, motor driven pump 110, and line 111. Energization of this circuit will cause solenoid 108 to open valve 112 in mother liquor line 113, and cause pump 110 to pump a slurry of crystals of component A in liquid component B through inlet line 102 and valve 114 to the interior of tube 100. Pumping of slurry will be continued, the crystalline component of the slurry being retained within tube 100, while the liquid component is led off through line 113, valve 112, and check valve 115, until the crystals have built up into a semi-solid column between the base of piston 116 and the top of previously formed column 101. When this state has been attained, pressure in line 102, due to the pressure drop through the crystal column, will have built up to a point at which valve 114 will close, as described in connection with Fig. 8. Closing of valve 114 will throw switch 105 to the position shown in dotted lines, in which position solenoid 108 will be deenergized, allowing valve 112 to close, and pump 110 will be shut off. While the crystal column is being built up, a portion of the liquid in heating zone 103 is being continuously drawn off through line 126 by positive displacement pump 127, bringing the level of pure liquid component A in crystal column 101 from the level of line $a$—$a$ to the level of line $b$—$b$. It will be understood that the quantity of liquid withdrawn by pump 127 will not be sufficient to allow any mother liquor to penetrate crystal column 101 to a distance sufficient to contaminate the liquid in the heating zone.

Shifting of switch 105 to the position shown in the dotted lines will also close a first motor circuit, which comprises lines 116, 117, and 118, motor 119, line 120, and source of power 106. Energization of this circuit will start motor 119, and the force applied via crankshaft 121 to piston rod 122 will start the piston 116 on its power stroke. As the piston 122 starts downward, spring switch 123, which has been held in open position by arm 124 on piston rod 122, will move to the position shown in the dotted lines to close a second motor circuit, comprising line 118, motor 119, line 120, source of power 106, and line 125. During its power stroke, piston 116 will force crystal column 101 downward into heating zone 103, until, at the end of the power stroke, the column and piston will have assumed the positions shown in the dotted lines. Forcing the crystal column downward will displace an equivalent amount of liquid from heating zone 103, displacing the mother liquor from the interstices of crystal column 101, and raising the level of pure liquid component A in column 101 to the level of line $a$—$a$. The displaced mother liquor will flow out through reflux line 128, together with a proportion of pure component A, valve 129 being forced open by the pressure generated by the power stroke of piston 116. This reflux liquid is returned to the process for the recovery of the component A contained therein.

When piston 116 has reached the end of its power stroke, it will start on its return stroke. Pressure inside tube 100 will now drop and valve 114 will open. Opening of valve 114 will throw switch 105 to energize the circuit which includes solenoid 108 and pump 110, opening valve 112 and causing pump 110 to start pumping slurry into tube 100. Mother liquor line 113 will, however, remain closed by check valve 115 to prevent backflow of liquid into tube 100 through line 113. Throwing of switch 105 will open the first motor circuit, but the motor 119 will continue to operate, since the second motor circuit is closed. As piston 116 nears the end of its return stroke, arm 124 will contact spring switch 123 to open the second motor circuit, whereupon the motor 119 will stop, and piston 116 will remain at rest until the first motor circuit is energized by the closing of valve 114 as described above.

The embodiment of Fig. 9 is particularly advantageous because no part of the power stroke is utilized for compressing the crystals, and hence the same quantity of component A can be handled with a much shorter tube than when operating with the embodiments of Figs. 2 through 8.

The herein described process and apparatus may be used to separate any liquid mixture which is adapted to be fractionated by crystallization, but has been found to be particularly useful in the separation of para-xylene from mixtures of its isomers, and in the separation of benzene from n-heptane.

*Example 1*

This example illustrates the manner in which the invention is applied to the separation of p-xylene from a mixture of p-xylene and m-xylene. A liquid feed, which comprises about 25% p-xylene in admixture with m-xylene and minor proportions of o-xylene, ethyl benzene, and saturates, is passed through line 10 and heat exchanger 13 to chiller 15, in which it is cooled to a temperature below —64° F., and preferably to a temperature approaching —90° F. in order to crystallize out all of the p-xylene which will crystallize as pure p-xylene, together with a small amount of crystals of the p-xylene-m-xylene eutectic. Presence of crystals of the eutectic insures maximum crystallization of the p-xylene, and is also useful for other purposes, as will be more particularly pointed out hereinafter.

The slurry of crystals in mother liquor is then passed to separation tube 16, motion of piston 24 is started, and the tube is operated under total reflux conditions until the liquid in heating zone 34 has reached the desired degree of purity, say 99% p-xylene. At this time, and with the piston in the position of Fig. 5, the crystals and liquid will have the composition shown in Fig. 10. The crystals in column 33 above zone $x$ will comprise a mixture of crystals of pure p-xylene and eutectic in a proportion such that, for example, the p-xylene content of the solid phase will be about 85%. The mother liquor surrounding these crystals will be at a temperature below —64° F., the same temperature as the crystals, and will contain, for example, 13% of p-xylene.

Through zones $x$, $y$, and $z$, the crystal mass will contain a progressively lesser quantity of eutetic crystals, the surrounding liquid will contain an increasing amount of p-xylene, and the temperature will steadily rise. For example, crystals at the top of zone $x$ may be 87% p-xylene at a temperature of below $-64°$ F.; at the top of zone $y$, 92% p-xylene at a temperature of below $-19°$ F.; at the top of zone $z$, 95% p-xylene at a temperature of below 21° F.; and at the bottom of zone $z$, 99% p-xylene at a temperature below 55° F. The liquor surrounding the crystals at the bottom of zone $z$ will contain about 99% p-xylene at a temperature above 55° F.; at the top of zone $z$ it may contain about 70% p-xylene at a temperature of above 31° F.; at the top of zone $y$, it may contain about 50% p-xylene, may be at a temperature above 10° F.; and at the top of zone $x$ it may contain about 30% p-xylene at a temperature above $-19°$ F. At all times the liquid in heating zone 34 is held above 55° F., the melting point of 99% pure p-xylene. It will be understood, of course, that there is no sharp break in purities or temperature when passing from one zone to another, the zones being indicated only for clarity in explanation.

Now when the piston 24 is moved to the position of Fig. 6, the column 33 will be forced down into heating zone 34, displacing warm liquid therefrom, which liquid will flow upwardly through the crystals. Since the liquid is warmer than the melting point of the eutectic, it will dissolve the eutectic crystals, and become progressively richer in m-xylene, while effecting a purification of the p-xylene crystals. Addition of the m-xylene to the wash liquid will lower its freezing point, so that as it becomes cooled by contact with the crystals it will not freeze and plug up tube 16.

This is an important reason for cooling the feed to a temperature at which at least a part of the eutectic will crystallize, since if the crystals in column 33 were pure p-xylene, very little dilution of the liquid would take place, and it would not be possible to pass it through any considerable portion of column 33 without freezing, and plugging the tube.

Eventually the displaced liquid will find its way to reflux line 17, and will be taken off therethrough for recycle to the process. In so doing, it will push zones $x$, $y$, and $z$ upward until the top of zone $x$ is level with reflux line 17. On the next stroke of the piston in moving from the position shown in Fig. 4 to that of Fig. 5, sufficient liquid will be withdrawn from bearing zone 34 through product line 18 to allow the zones to again drop to the position shown in Fig. 10.

It will be understood, of course, that while specific parts of the apparatus have been illustrated as associated with other specific parts in the various drawings, such parts, while not illustrated specifically in each of the embodiments, may be used interchangeably with parts performing similar functions. For example, the pressure control valve 28, illustrated in Figs. 2 through 6, may be replaced by the positive displacement pump 127 of Fig. 9 and vice versa. It will also be understood that while electricity has been illustrated as the source of power in Figs. 7 through 9, other power sources, such as compressed air or steam, may also be used to actuate the various valves and the piston.

I claim:

1. A fractional crystallization apparatus including in combination a separation tube, a heating zone in one end of said separation tube, means for supplying heat to said heating zone, a first liquid outlet connecting with the separation tube associated with said heating zone, a reciprocable piston within said tube and removed from said heating zone, a motor adapted to impart reciprocating motion to said piston, a second liquid outlet connecting with the separation tube ahead of said reciprocable piston at its point of furthest entry into said tube, means associated with said second liquid outlet adapted to allow passage of liquid therethrough only during the movement of the piston from its point of least entry into the tube to its point of furthest entry into the tube, a third liquid outlet connecting with the separation tube ahead of the reciprocating piston at its point of least entry into said tube and adjacent to and behind said piston at its point of furthest entry into said tube, valve means associated with said third liquid outlet, an inlet for introducing a slurry of solids in liquid connecting with the separation tube at a point between the second liquid outlet and the third liquid outlet and adjacent to and ahead of said reciprocable piston at its point of furthest entry into the tube, pump means associated with said inlet, normally open valve means in said inlet adapted to close in response to rising pressure in said inlet, means associated with the valve means in the inlet adapted to start said driving means, stop said pump means, and close the valve associated with said third liquid outlet upon closing of said inlet valve in response in rising pressure in said inlet, and to start said pump means and to open said valve means associated with said third liquid outlet upon opening of said inlet valve in response to decreasing pressure in the inlet, a second valve means in said third liquid outlet adapted to close said third liquid outlet only during movement of the piston from its point of furthest entry into said tube to its point of least entry into said tube, secondary means associated with the piston for starting said driving means during the power stroke of the piston, and for stopping said driving means upon the return of the piston to its point of least entry into the tube, and screening means associated with said second liquid outlet and said third liquid outlet adapted to prevent the passage of crystals therethrough.

2. The fractional crystallization apparatus according to claim 1 including means associated with said first liquid outlet operative to allow the passage therethrough of liquid from the heating zone during at least part of the movement of the piston from its point of least entry into the tube to its point of furthest entry into the tube, and operative to close said first liquid outlet during movement of the piston from its point of furthest entry into the tube to its point of least entry into the tube.

3. The fractional crystallization apparatus according to claim 1 including means associated with said first liquid outlet for continuously withdrawing a limited amount of liquid therethrough from the heating zone.

4. A fractional crystallization apparatus including in combination a separation tube, a heating zone in one end of said separation tube, means for supplying heat to said heating zone, a first liquid outlet connecting with the separation tube associated with said heating zone, an inlet for introducing crystals and liquid into said tube at a point removed from said heating zone, a reciprocating piston within said tube and removed from said heating zone, said piston having a lesser horizontal cross-sectional area than the interior of the separation tube, a wall engaging member carried by the piston, said member being adapted to move in contact with the interior wall of the separation tube, and being so located on the piston that it is behind said inlet when the piston is at its point of furthest entry into said tube, a second liquid outlet connecting with the separation tube ahead of said reciprocating piston at its point of furthest entry into said tube, a third liquid outlet connecting with the separation tube ahead of said reciprocating piston at its point of least entry into said tube and adjacent and behind said reciprocating piston at its point of furthest entry into said tube and means associated with said second liquid outlet adapted to close said second liquid outlet except during the movement of the piston from a point adjacent said third liquid outlet to its point of furthest entry into said separation tube.

5. The fractional crystallization process according to claim 4 including in combination means associated with said third liquid outlet operative to close off said outlet during the movement of the piston from its point of furthest entry into the tube to its point of least entry into said tube.

6. The fractional crystallization apparatus according to claim 4 including means associated with said inlet operative to close off said inlet during the movement of the piston from its point of least entry into the tube to its point of furthest entry into the tube.

7. The fractional crystallization apparatus according to claim 6 in which the means associated with said inlet is also operative to close off said third liquid outlet during the movement of the piston from a point adjacent said third liquid outlet to its point of furthest entry into said tube.

8. The apparatus according to claim 6 including screening means associated with said second liquid outlet and said third liquid outlet adapted to prevent the passage of crystals therethrough.

9. The apparatus according to claim 8 including means associated with said first liquid outlet operative to allow the passage therethrough of liquid from the heating zone during at least a part of the movement of the piston from its point of least entry into the tube to its point of furthest entry into the tube and operative to close off said first liquid outlet during movement of the piston from its point of furthest entry into the tube to its point of least entry into the tube.

10. The apparatus according to claim 8 including means associated with said first liquid outlet for continuously withdrawing a limited amount of liquid therethrough from the heating zone.

11. A crystal purification apparatus including in combination a separation tube, a heating zone in one end of said separation tube, means for supplying heat to said heating zone, a reciprocatable piston within said tube and removed from said heating zone, a first liquid outlet connecting with the separation tube associated with said heating zone, a second liquid outlet connecting with the separation tube spaced from the heating zone, a third liquid outlet connecting with the separation tube at a point spaced farther from the heating zone than the second liquid outlet, means for reciprocating the piston toward and away from the heating zone in a manner such that it passes said third liquid outlet but does not reach said second liquid outlet during its movement toward the heating zone, and an inlet for introducing a slurry of solids and liquids into said tube connecting therewith at a point spaced farther from the heating zone than the second liquid outlet, and means for maintaining said inlet in free communication with the interior of the tube at all times during the reciprocation of the piston.

References Cited in the file of this patent
UNITED STATES PATENTS

| | | |
|---|---|---|
| 2,617,274 | Schmidt | Nov. 11, 1952 |
| 2,683,178 | Findlay | July 6, 1954 |
| 2,747,001 | Weedman | May 22, 1956 |
| 2,751,890 | Rush | June 26, 1956 |
| 2,765,921 | Green | Oct. 9, 1956 |